(12) United States Patent
Yasui et al.

(10) Patent No.: US 11,065,571 B2
(45) Date of Patent: Jul. 20, 2021

(54) HONEYCOMB FILTER (71) Applicant: NGK INSULATORS, LTD., Nagoya (JP)

(72) Inventors: Osamu Yasui, Nagoya (JP); Kazuto Miura, Nagoya (JP); Tomohiro Iida, Nagoya (JP); Yukio Miyairi, Nagoya (JP); Takashi Aoki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 476 days.

(21) Appl. No.: 15/935,485

(22) Filed: Mar. 26, 2018

(65) Prior Publication Data

US 2018/0280860 A1     Oct. 4, 2018

(30) Foreign Application Priority Data

Mar. 30, 2017  (JP) .............. JP2017-068053

(51) Int. Cl.
*B01D 46/24*   (2006.01)
*F01N 3/022*   (2006.01)
*B01D 39/20*   (2006.01)

(52) U.S. Cl.
CPC ....... *B01D 46/2474* (2013.01); *B01D 46/247* (2013.01); *F01N 3/0222* (2013.01);
(Continued)

(58) Field of Classification Search
CPC .............. B01D 46/2474; B01D 46/247; B01D 2046/2433; F01N 3/0222; F01N 2330/06; F01N 2330/34; F01N 3/022
See application file for complete search history.

(56) References Cited

U.S. PATENT DOCUMENTS

2002/0192426 A1* 12/2002 Ichikawa ............. B01D 53/885
428/116
2004/0258582 A1   12/2004 Miwa et al.
(Continued)

FOREIGN PATENT DOCUMENTS

CN     1856349 A    11/2006
EP   2 402 295 A1    1/2012
(Continued)

OTHER PUBLICATIONS

Chinese Office Action, Chinese Application No. 201810261779.0, dated Dec. 30, 2020 (7 pages).
(Continued)

*Primary Examiner* — Lucas A Stelling
*Assistant Examiner* — Hafiz Muhammad Aamir
(74) *Attorney, Agent, or Firm* — Burr & Brown, PLLC (57) ABSTRACT

Provided is a honeycomb filter, including: a pillar-shaped honeycomb substrate having an inflow end face and an outflow end face and including a porous partition wall surrounding a plurality of cells; and a plugging portion disposed at any one of ends of the cells at the inflow end face and at the outflow end face. In a cross section orthogonal to an extending direction of the cells, inflow cells have a pentagonal or a hexagonal shape, and outflow cells have a square shape. The cells are configured that the inflow cells surround one outflow cell and one side of an inflow cell and one side of an adjacent outflow cell are parallel to each other. The partition wall is configured that thickness of a first partition wall disposed between the inflow cells and the outflow cells is larger than thickness of a second partition wall disposed between the inflow cells.

9 Claims, 6 Drawing Sheets (52) U.S. Cl.
CPC ............... *B01D 2046/2433* (2013.01); *B01D 2046/2481* (2013.01); *B01D 2046/2492* (2013.01); *F01N 2330/06* (2013.01); *F01N 2330/34* (2013.01)

(56) References Cited

U.S. PATENT DOCUMENTS

| | | |
|---|---|---|
| 2005/0066639 A1 | 3/2005 | Frost |
| 2007/0180804 A1 | 8/2007 | Mizutani |
| 2007/0240396 A1 | 10/2007 | Mizutani |
| 2014/0298779 A1* | 10/2014 | Miyairi ................... F01N 3/022 60/298 |
| 2015/0240678 A1 | 8/2015 | Aoyama et al. |

FOREIGN PATENT DOCUMENTS

| | | |
|---|---|---|
| JP | 2003-205245 A | 7/2003 |
| JP | 2007-209842 A1 | 8/2007 |
| JP | 4279497 B2 | 6/2009 |
| JP | 4567674 B2 | 10/2010 |
| JP | 2012-081415 A1 | 4/2012 |
| JP | 2014-200741 A1 | 10/2014 |
| JP | 2015-157257 A | 9/2015 |
| WO | 2010/098347 A1 | 9/2010 |

OTHER PUBLICATIONS

Japanese Office Action (with English translation), Japanese Application No. 2017-068053, dated Nov. 10, 2020 (8 pages).

* cited by examiner

HONEYCOMB FILTER

"The present application is an application based on JP-2017-068053 filed on Mar. 30, 2017 with Japan Patent Office, the entire contents of which are incorporated herein by reference."

BACKGROUND OF THE INVENTION

Field of the Invention

The present invention relates to honeycomb filters. More specifically the present invention relates to a honeycomb filter having low pressure loss while having improved thermal shock resistance.

Description of the Related Art

Internal combustion engines are used as a power source in various industries. Exhaust gas emitted from such an internal combustion engine during burning of the fuel, however, contains particulate matters, such as soot and ash, together with toxic gas, such as nitrogen oxides. Hereinafter the particulate matters may be called "PM". "PM" stands for "Particulate Matter". Regulations on the removal of PMs emitted from a diesel engine are becoming stricter worldwide. A honeycomb-structured wall flow type filter, for example, has been used for a filter to remove such PMs.

For such a wall-flow type filter, various types of honeycomb filters have been proposed, which includes a honeycomb substrate having a porous partition wall that defines a plurality of cells serving as a through channel of fluid, and a plugging portion disposed at the open ends of the plurality of cells on any one side (see Patent Documents 1 to 4, for example). For example, such a honeycomb filter has inflow cells having a plugging portion at their outflow end faces and outflow cells having a plugging portion at their inflow end faces, the inflow cells and the outflow cells being disposed alternately via the partition wall. The porous partition wall serves as a filter to remove PMs.

One of the proposed wall-flow type honeycomb filters is configured to have a shape of the cells that is a combination of hexagons and squares in a cross section orthogonal to the center axis direction of the honeycomb structure body (Patent Document 5, for example). Such a honeycomb filter has excellent strength in high temperature and can have reduced pressure loss.

[Patent Document 1] JP-A-2007-209842
[Patent Document 2] JP-A-2012-081415
[Patent Document 3] JP-B-4279497
[Patent Document 4] JP-B-4567674
[Patent Document 5] JP-A-2014-200741

SUMMARY OF THE INVENTION

The honeycomb filter described in Patent Document 5 is configured to include four cells having open inlets (they may be called "inflow cells" hereinafter) that surround one cell having an open outlet (this may be called an "outflow cell" hereinafter). The honeycomb filter described in Patent Document 5 therefore has two types of partition walls including "a partition wall disposed between an inflow cell and an outflow cell" and "a partition wall disposed between inflow cells".

Such a honeycomb filter typically has a tendency of less exhaust gas flowing through the "partition wall disposed between inflow cells" than through the "partition wall disposed between an inflow cell and an outflow cell". A honeycomb filter as described in Patent Document 5 therefore may have a problem of non-uniform flow of exhaust gas between these two types of partition walls, and so of an increase in pressure loss of the honeycomb filter.

In view of such problems of the conventional techniques, the present invention provides a honeycomb filter having low pressure loss while having improved thermal shock resistance.

The present invention provides the following honeycomb filter.

According to a first aspect of the present invention, a honeycomb filter is provided, including: a pillar-shaped honeycomb substrate having an inflow end face and an outflow end face and including a porous partition wall that surrounds a plurality of cells extending from the inflow end face to the outflow end face; and a plugging portion disposed at any one of ends of the cells at the inflow end face and at the outflow end face, wherein in a cross section orthogonal to an extending direction of the cells, inflow cells having the plugging portion at the ends of the outflow end face have a pentagonal or a hexagonal shape, outflow cells having the plugging portion at the ends of the inflow end face have a square shape, the plurality of cells is configured so that a plurality of the inflow cells surrounds one outflow cell and one side of an inflow cell and one side of an adjacent outflow cell are parallel to each other, and the partition wall is configured so that thickness T1 of a first partition wall disposed between the inflow cells and the outflow cells is larger than thickness T2 of a second partition wall disposed between the inflow cells.

According to a second aspect of the present invention, the honeycomb filter according to the first aspect is provided, wherein a value of ratio (T1/T2) of the thickness T1 of the first partition wall to the thickness T2 of the second partition wall is 1.05 to 2.95.

According to a third aspect of the present invention, the honeycomb filter according to the second aspect is provided, wherein the value of ratio (T1/T2) of the thickness T1 of the first partition wall to the thickness T2 of the second partition wall is 1.1 to 2.15.

According to a fourth aspect of the present invention, the honeycomb filter according to any one of the first to third aspects is provided, wherein the thickness T1 of the first partition wall is 150 to 600 μm.

According to a fifth aspect of the present invention, the honeycomb filter according to any one of the first to fourth aspects is provided, wherein the outflow cells have a smaller hydraulic diameter than a hydraulic diameter of the inflow cells.

According to a sixth aspect of the present invention, the honeycomb structure according to any one of the first to fifth aspects is provided, wherein the outflow cells have a length of one side of 0.6 to 3.0 mm According to a seventh aspect of the present invention, the honeycomb filter according to any one of the first to sixth aspects is provided, wherein the partition wall has porosity of 35 to 70%.

According to an eighth aspect of the present invention, the honeycomb filter according to the seventh aspect is provided, wherein the partition wall has porosity of 50 to 70%.

According to a ninth aspect of the present invention, the honeycomb filter according to any one of the first to eighth aspects is provided, wherein in a cross section orthogonal to an extending direction of the cells, wherein the honeycomb filter has a configuration of four of the inflow cells having a hexagonal shape surrounding one of the outflow cells or of eight of the inflow cells having a pentagonal shape surrounding one of the outflow cells.

A honeycomb filter of the present invention is configured to include a first partition wall disposed between an inflow cell and an outflow cell and having thickness T1 and a second partition wall disposed between inflow cells and having thickness T2, and T1 is larger than T2. That is, the honeycomb filter of the present invention satisfies the relationship of "T1>T2". With this configuration, the honeycomb filter of the present invention can include the second partition wall having relatively small thickness T2 and having small permeation resistance. With this configuration, the honeycomb filter of the present invention can have an advantageous effect of flowing exhaust gas effectively through the second partition wall as well, through which less exhaust gas flows typically, and so of realizing low pressure loss.

The honeycomb filter of the present invention can have another advantageous effect of increasing the amount of PMs trapped at the surface of the second partition wall during trapping of PMs, such as soot, in exhaust gas, because the honeycomb filter can flow exhaust gas effectively through the second partition wall as well. That is, the honeycomb filter can trap PMs actively on the second partition wall as well by promoting the movement of exhaust gas between inflow cells through the second partition wall, instead of trapping PMs mainly on the first partition wall. The honeycomb filter of the present invention therefore can have improved thermal shock resistance during regeneration treatment to burn trapped PMs for removal.

DESCRIPTION OF THE PREFERRED EMBODIMENTS

The following describes embodiments of the present invention. The present invention is not limited to the following embodiments. The present invention is therefore to be understood to include the following embodiments, to which modifications and improvements are added as needed based on the ordinary knowledge of a person skilled in the art without departing from the scope of the present invention.

Figure 1:
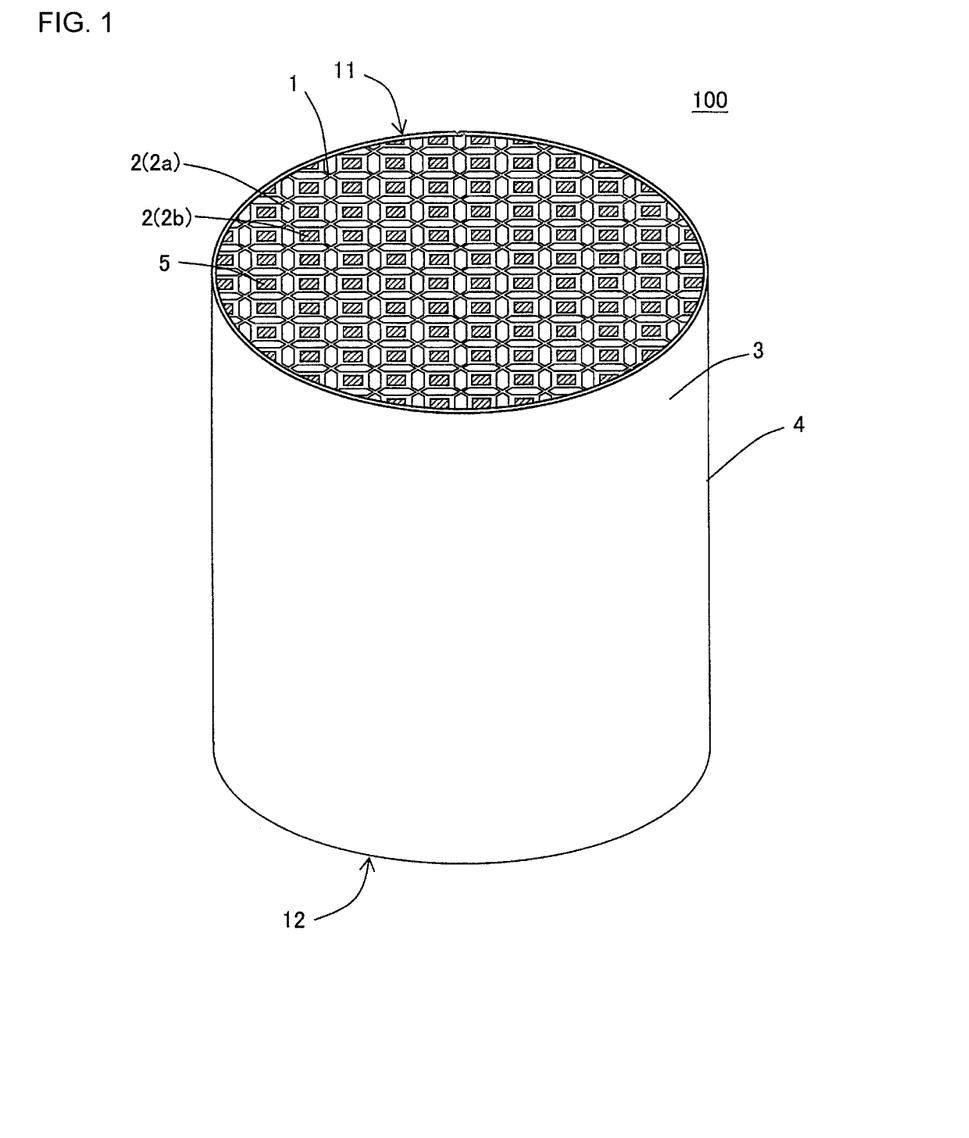
FIG. 1 is a perspective view schematically showing one embodiment of a honeycomb filter of the present invention viewed from the inflow end face.
Figure 2:
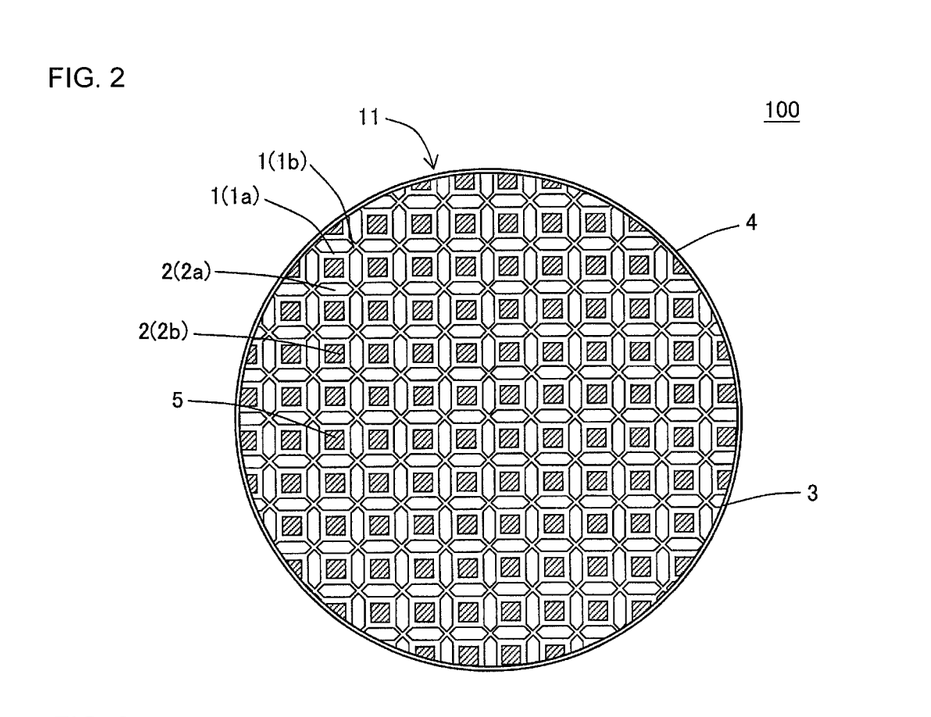
FIG. 2 is a plan view schematically showing the inflow end face of the honeycomb filter of FIG. 1.
Figure 3:
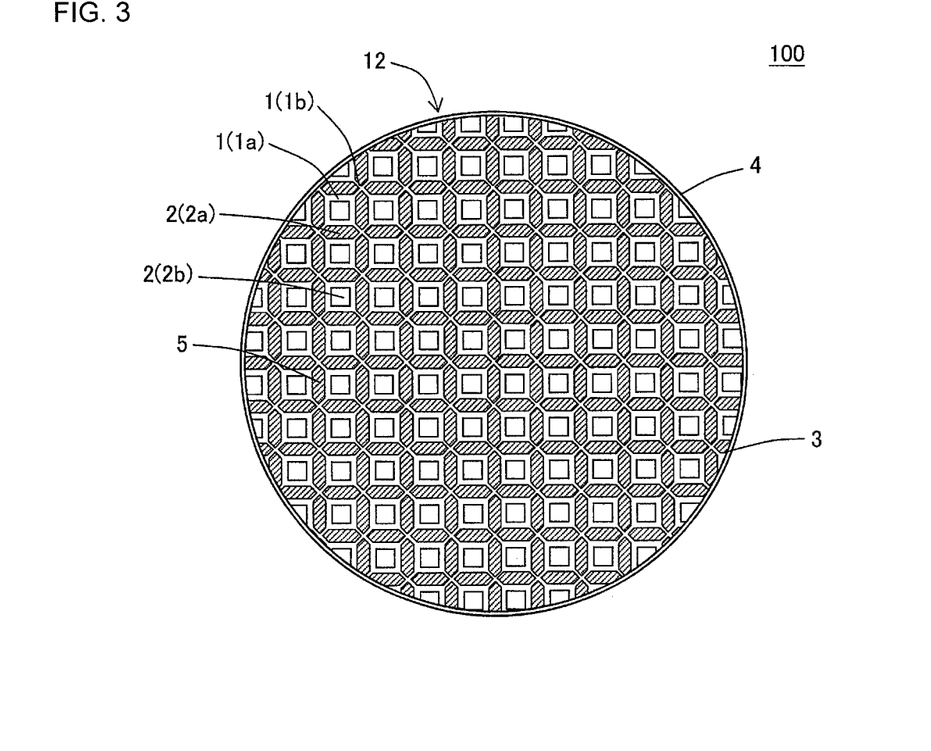
FIG. 3 is a plan view schematically showing the outflow end face of the honeycomb filter of FIG. 1.
Figure 4:
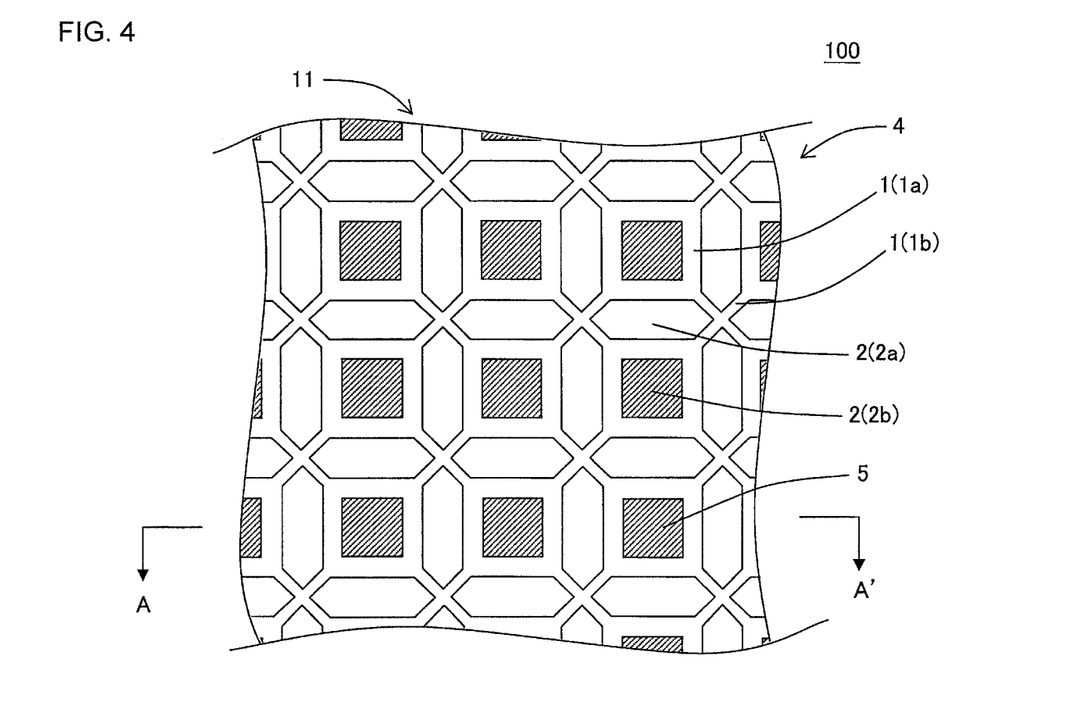
FIG. 4 is an enlarged plan view of a part of the inflow end face in FIG. 2.
Figure 5:
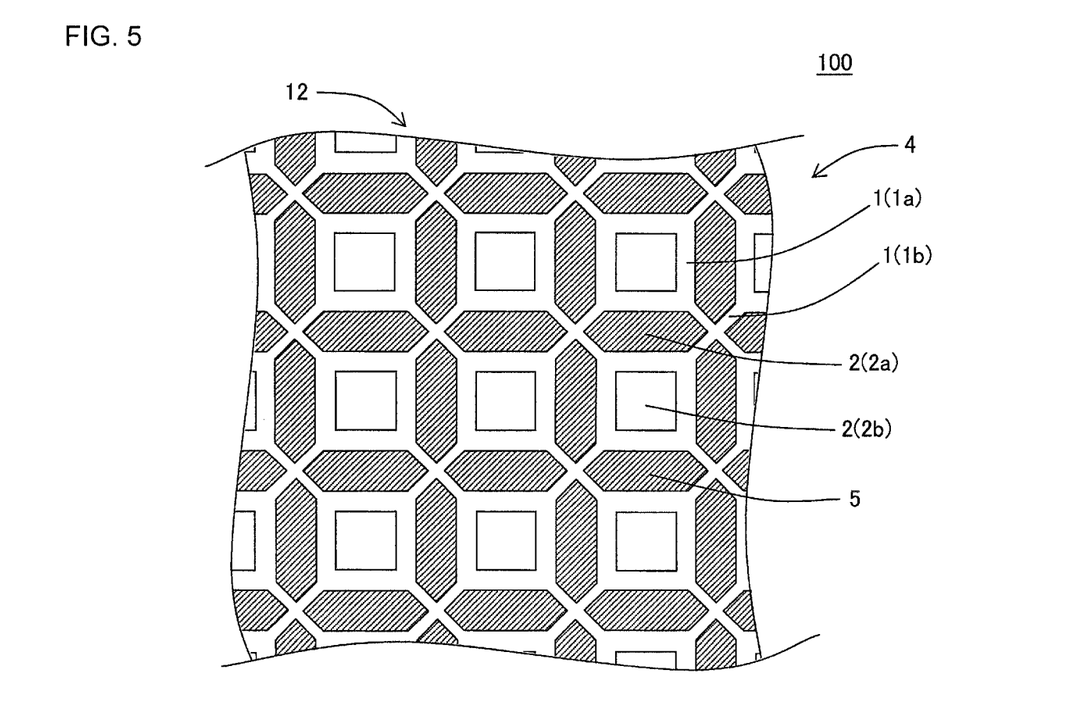
FIG. 5 is an enlarged plan view of a part of the outflow end face in FIG. 3.
Figure 6:
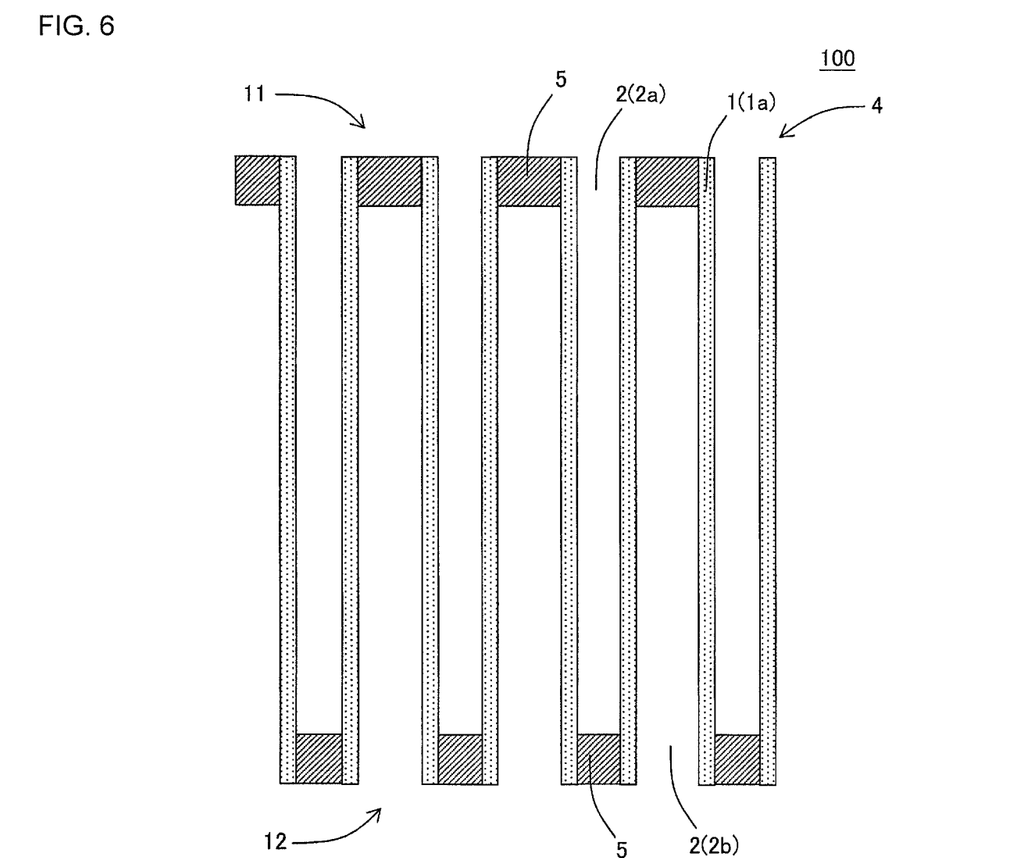
FIG. 6 is a schematic cross-sectional view taken along the line A-A' of FIG. 4.
Figure 7:
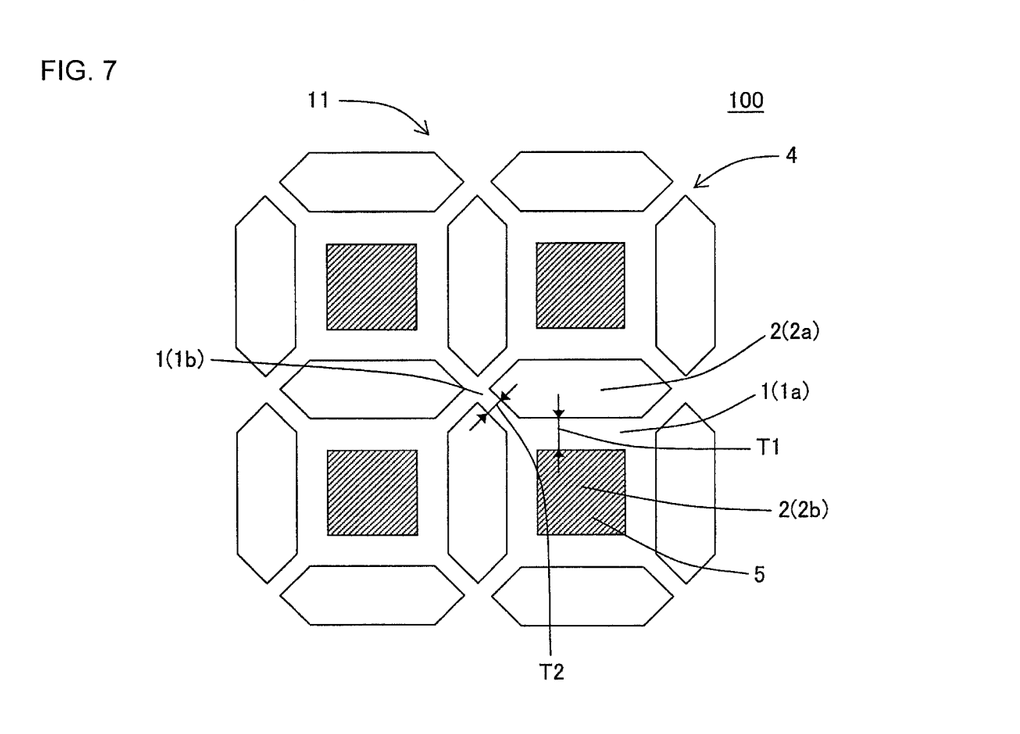
FIG. 7 schematically describes the shape of cells in FIG. 4.
Figure 8:
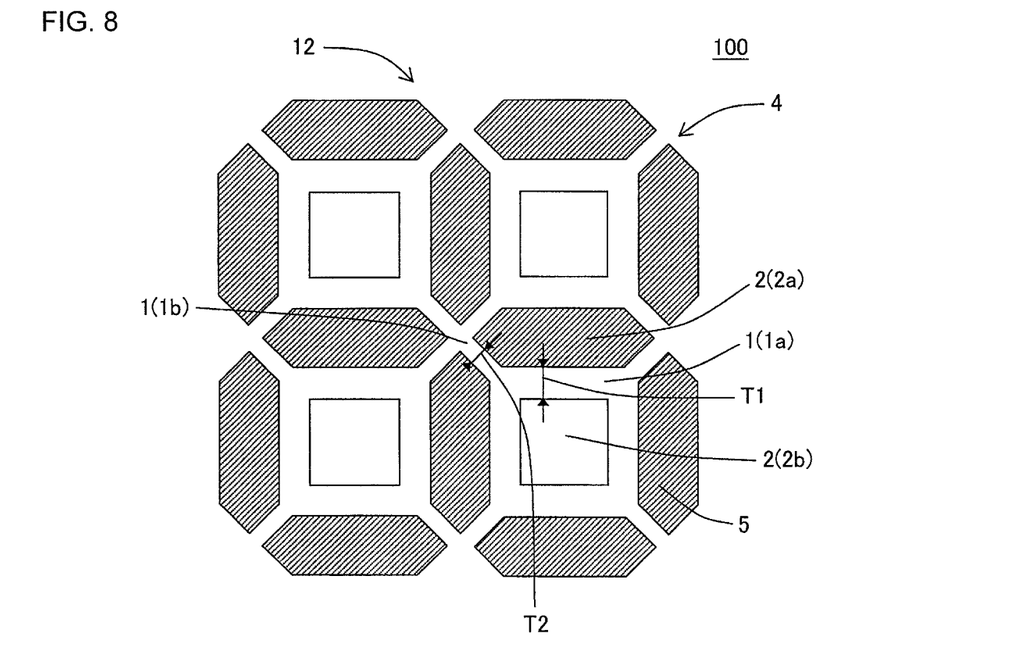
FIG. 8 schematically describes the shape of cells in FIG. 5.

(1) Honeycomb Filter:

One embodiment of the honeycomb filter of the present invention is a honeycomb filter 100 as shown in FIGS. 1 to 8. FIG. 1 is a perspective view schematically showing one embodiment of the honeycomb filter of the present invention viewed from the inflow end face. FIG. 2 is a plan view schematically showing the inflow end face of the honeycomb filter of FIG. 1. FIG. 3 is a plan view schematically showing the outflow end face of the honeycomb filter of FIG. 1. FIG. 4 is an enlarged plan view of a part of the inflow end face in FIG. 2. FIG. 5 is an enlarged plan view of a part of the outflow end face in FIG. 3. FIG. 6 is a schematic cross-sectional view taken along the line A-A' of FIG. 4. FIG. 7 schematically describes the shape of cells in FIG. 4. FIG. 8 schematically describes the shape of cells in FIG. 5.

The honeycomb filter 100 includes a honeycomb substrate 4 and a plugging portion 5. The honeycomb substrate 4 has a pillar shape having an inflow end face 11 and an outflow end face 12. The honeycomb substrate 4 includes a porous partition wall 1 that surrounds a plurality of cells 2 extending from the inflow end face 11 to the outflow end face 12. The honeycomb substrate 4 in FIGS. 1 to 3 further includes a circumferential wall 3 disposed so as to surround the partition wall 1. In the present invention, cells 2 refer to a space surrounded with the partition wall 1.

The plugging portion 5 is disposed at ends of the cells 2 formed in the honeycomb substrate 4 at any one of the inflow end face 11 and the outflow end face 12 so as to plug the open ends of the cells 2. Hereinafter the cells 2 having the plugging portion 5 at the ends of the outflow end face 12 are called "inflow cells 2a". The cells 2 having the plugging portion 5 at the ends of the inflow end face 11 are called "outflow cells 2b".

In the honeycomb filter 100 of the present embodiment, the inflow cells 2a and the outflow cells 2b have different shapes in a cross section orthogonal to the extending direction of the cells 2. The shape of the inflow cells 2a is a pentagon or a hexagon. The shape of the outflow cells 2b is a square. Hereinafter the "shape of the cells" in a cross section orthogonal to the extending direction of the cells 2 may be called a "cross-sectional shape of the cells" or simply a "shape of the cells". In this specification, a "pentagon" a "hexagon" and a "square" as stated above mean a "substantial pentagon", a "substantial hexagon" and a "substantial square", respectively, as described later.

A plurality of cells 2 is configured so that a plurality of inflow cells 2a surrounds one outflow cell 2b and one side of an inflow cell 2a and one side of an adjacent outflow cell 2b are parallel to each other. In the honeycomb filter 100 shown in FIGS. 1 to 8, four hexagonal inflow cells 2a surround one outflow cell 2b. In this specification, "parallel" as described above means "substantial parallel" as described later.

In the honeycomb filter 100, a part of the partition wall 1 disposed between an inflow cell 2a and an outflow cell 2b is called a "first partition wall 1a". A part of the partition wall 1 disposed between inflow cells 2a is called a "second partition wall 1b". The honeycomb filter 100 of the present embodiment has a major feature that thickness T1 of the first partition wall 1a is larger than thickness T2 of the second partition wall 1b.

The honeycomb filter 100 of the present embodiment has an advantageous effect of having low pressure loss while having improved thermal shock resistance as compared with an existing honeycomb filter having the same open frontal area. That is, such a second partition wall 1b having relatively small thickness T2 can decrease the permeation resistance of the second partition wall 1b and can have more uniform flow of exhaust gas at the first partition wall 1a and at the second partition wall 1b. In other words, the honeycomb filter 100 of the present embodiment can have small permeation resistance at the second partition wall 1b as compared with an existing honeycomb filter having the same open frontal area. With this configuration, the honeycomb filter 100 of the present invention can flow exhaust gas effectively through the second partition wall 1b as well, through which less exhaust gas flows typically, and so realizing the low pressure loss.

The honeycomb filter 100 of the present embodiment can have another advantageous effect of increasing the amount of PMs trapped at the surface of the second partition wall 1b during trapping of PMs, such as soot, in exhaust gas, because the honeycomb filter can flow exhaust gas effectively through the second partition wall 1b as well. That is, the honeycomb filter 100 can trap PMs actively on the second partition wall 1b as well by promoting the movement of exhaust gas between inflow cells 2a through the second partition wall 1b, instead of trapping PMs mainly on the first partition wall 1a. The honeycomb filter 100 of the present embodiment therefore can have improved thermal shock resistance during regeneration treatment to burn trapped PMs for removal.

The honeycomb filter 100 has a tendency of relatively low strength at the intersections of the first partition wall 1a and the second partition wall 1b. Due to the tendency, when a large amount of PMs are accumulated at the surface of the first partition wall 1a only, the temperature at a part around the intersections of the first partition wall 1a and the second partition wall 1b becomes very high during the regeneration treatment as stated above, and this may cause a breakage of the honeycomb filter 100. According to the honeycomb filter 100 of the present embodiment, PMs are accumulated on the second partition wall 1b as well in a distributed manner, and so rise in burning temperature during the regeneration treatment can be suppressed.

In this specification, a "substantial pentagon" means a pentagonal shape, a pentagonal shape having at least one curved corner of the pentagon, and a pentagonal shape having at least one corner of the pentagon that is linearly chamfered. When a second partition wall disposed between inflow cells has an "inclined part in thickness" as described later, these inflow cells are assumed to have a shape obtained by considering the two sides making up the "inclined part in thickness" as parallel two sides. A "substantial hexagon" means a hexagonal shape, a hexagonal shape having at least one curved corner of the hexagon, and a hexagonal shape having at least one corner of the hexagon that is linearly chamfered. A "substantial square" means a square shape, a square shape having at least one curved corner of the square, and a square shape having at least one corner of the square that is linearly chamfered. "Substantial parallel" means the positional relationship between two sides that are parallel and between parallel two sides, one of which is inclined within the range of ±15°.

In the honeycomb filter of the present embodiment, the thickness of the partition wall 1 at the parts of the first partition wall 1a and of the second partition wall 1b is not limited especially as long as T1 is larger than T2 as shown in FIGS. 7 and 8. It should be noted that the value of "T1/T2" as the ratio of thickness T1 of the first partition wall 1a to thickness T2 of the second partition wall 1b is 1.05 to 2.95 preferably, more preferably 1.10 to 2.15, still more preferably 1.15 to 2.15 and particularly preferably 1.15 to 1.70. If the value of "T1/T2" is less than 1.05, the permeation resistance at the second partition wall 1b cannot be sufficiently lower than the permeation resistance at the first partition wall 1a, which may lead to the failure of achieving a sufficient effect of lowering the pressure loss. If the value of "T1/T2" exceeds 2.95, the permeation resistance at the second partition wall 1b is too low as compared with the permeation resistance at the first partition wall 1a, and so the first partition wall 1a cannot function effectively. This may lead to the failure of achieving a sufficient effect of lowering the pressure loss.

Thickness T1 of the first partition wall 1a preferably is 150 to 600 μm, more preferably 170 to 380 μm, and particularly preferably 200 to 300 μm. The thus configured honeycomb filter 100 can have lower pressure loss while having improved thermal shock resistance.

Thickness T1 of the first partition wall 1a and thickness T2 of the second partition wall 1b can be measured with a microscope. For the microscope, VHK-1000 (product name) produced by Keyence Corporation may be used, for example. Specifically the honeycomb filter 100 is firstly cut to be orthogonal to the extending direction of the cells 2. Then the first partition wall 1a and the second partition wall 1b on the cut plane of the honeycomb filter 100 are observed with a microscope to measure their thicknesses. At this time, "thickness T1 of the first partition wall 1a" is a thickness of the thinnest part of the first partition wall 1a between one side of an inflow cell 2a and one side of an adjacent outflow cell 2b. Similarly "thickness T2 of the second partition wall 1b" is a thickness of the thinnest part of the second partition wall 1b between two inflow cells.

In the honeycomb filter 100 of the present embodiment, hydraulic diameter is preferably smaller at the outflow cells 2b than at the inflow cells 2a. The thus configured honeycomb filter can easily have an advantageous effect of lowering pressure loss while having improved thermal shock resistance. Hydraulic diameter is a calculated value based on the cross-sectional area and the perimeter of each cell 2 by 4×(cross-sectional area)/(perimeter).

The hydraulic diameter of the inflow cells 2a is preferably 0.70 to 1.30 mm, more preferably 0.85 to 1.15 mm, and particularly preferably 0.90 to 1.10 mm. Preferably the hydraulic diameter of the inflow cells 2a is 0.50 to 1.30 times the hydraulic diameter of the outflow cells 2b, more preferably 0.75 to 0.95 times.

Preferably the outflow cells 2b have the length of one side that is 0.6 to 3.0 mm, more preferably 0.6 to 2.0 mm, and particularly preferably 0.7 to 1.5 mm. The thus configured honeycomb filter can easily have an advantageous effect of lowering pressure loss while having improved thermal shock resistance.

Preferably the partition wall 1 of the honeycomb substrate 4 has porosity of 35 to 70%, and more preferably 50 to 70%. If the porosity of the partition wall 1 is less than 35%, the pressure loss may increase. If the porosity of the partition wall 1 exceeds 70%, the strength of the honeycomb substrate 4 is not enough. When such a honeycomb filter 100 is stored in a casing used for an exhaust-gas purifying apparatus, it is difficult to hold the honeycomb filter 100 with a sufficient grip force. The porosity of the partition wall 1 is a value measured with a mercury porosimeter. For the mercury porosimeter, Autopore 9500 (product name) produced by Micromeritics Co. may be used, for example.

From the viewpoint of strength, heat resistance, durability, and the like, the partition wall 1 is preferably made of various types of ceramics, such as oxides and non-oxides, and metals as major components. Specifically, ceramics preferably include at least one type of materials selected from the group consisting of cordierite, mullite, alumina, spinel, silicon carbide, silicon nitride, and aluminum titanate. Examples of the metals include Fe—Cr—Al based metals and metal silicon. One type or two types or more selected from these materials may be included as a major component. Particularly preferably, one type or two types or more selected from the group consisting of alumina, mullite, aluminum titanate, cordierite, silicon carbide, and silicon nitride is included as a major component from the viewpoints of high strength and high heat resistance. The ceramic material may be a composite material obtained by binding silicon carbide particles with cordierite as a binder, for example. Silicon carbide or silicon-silicon carbide composite materials are particularly suitable from the viewpoints of high heat conductivity and high heat resistance. Herein, the "major component" refers to a component making up 50 mass % or more of the components, preferably 70 mass % or more, and more preferably 80 mass % or more.

The material of the plugging portion 5 is not limited especially, and a material mentioned in the above for the partition wall 1 can be used favorably.

The overall shape of the honeycomb filter is not limited especially. For the overall shape of the honeycomb filter of the present embodiment, the inflow end face and the outflow end face preferably have a circular shape or an elliptic shape, and preferably have a circular shape. The size of the honeycomb filter is not limited especially, and the length from the inflow end face to the outflow end face is preferably 50 to 300 mm. When the overall shape of the honeycomb filter is a round pillar-shape, their end faces preferably have a diameter of 100 to 400 mm.

The honeycomb filter of the present embodiment is preferably used as a member for exhaust-gas purification in an internal combustion engine. In the honeycomb filter of the present embodiment, at least one of the surface of the partition wall and the pores of the partition wall of the honeycomb substrate may be loaded with catalyst for exhaust-gas purification.

Figure 9:
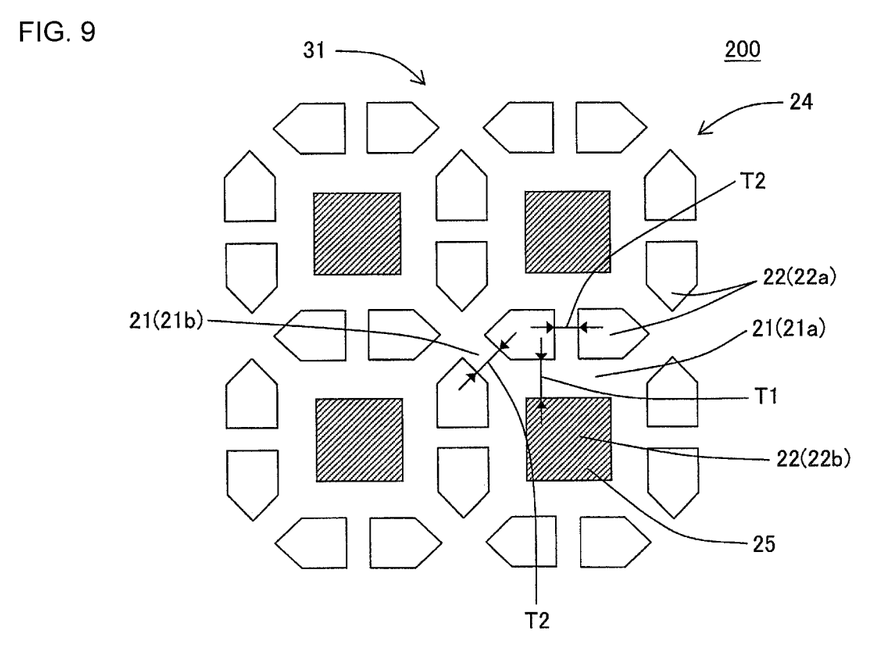
FIG. 9 is a schematic view to explain the shape of cells in another embodiment of the honeycomb filter according to the present invention.

The following describes another embodiment of the honeycomb filter of the present invention, with reference to FIG. 9. FIG. 9 is a schematic view to explain the shape of cells in another embodiment of the honeycomb filter according to the present invention.

A honeycomb filter 200 in FIG. 9 includes a honeycomb substrate 24 and a plugging portion 25. The honeycomb substrate 24 has a pillar shape having an inflow end face 31 and an outflow end face (not illustrated). The honeycomb substrate 24 includes a porous partition wall 21 that surrounds a plurality of cells 22 extending from the inflow end face 31 to the outflow end face (not illustrated).

In the honeycomb filter 200 shown in FIG. 9, inflow cells 22a have a pentagonal shape and outflow cells 22b have a square shape in a cross section orthogonal to the extending direction of the cells 22. In the honeycomb filter 200, eight pentagonal inflow cells 22a surround one outflow cell 22b.

The honeycomb filter 200 is configured so that thickness T1 of the first partition wall 21a disposed between an inflow cell 22a and an outflow cell 22b is larger than thickness T2 of the second partition wall 21b disposed between inflow cells 22a.

The thus configured honeycomb filter 200 also has an advantageous effect of having low pressure loss while having improved thermal shock resistance as compared with an existing honeycomb filter having the same open frontal area. The honeycomb filter 200 is configured so that each of the eight parts of the second partition walls 21b intersects with the first partition wall 21a surrounding one outflow cell 22b. With this configuration, a larger effect can be expected from this honeycomb filter when the second partition wall 21b functions as the through channel of exhaust gas.

The honeycomb filter 200 is preferably configured similarly to the honeycomb filter 100 shown in FIGS. 1 to 8 as stated above other than that the shape of the inflow cells 22a is a pentagon.

(2) Method for Manufacturing Honeycomb Filter:

The following describes a method for manufacturing the honeycomb filter of the present invention.

Firstly a kneaded material having plasticity is prepared to produce a honeycomb substrate. The kneaded material to produce a honeycomb substrate can be prepared by adding additives, such as binder, and water as needed to a material selected as raw material powder from the aforementioned materials suitable for the partition wall.

Next, the thus prepared kneaded material is extruded, thus producing a pillar-shaped honeycomb formed body having a partition wall defining a plurality of cells and a circumferential wall disposed at the outermost circumference. In the extrusion, a die for the extrusion has an extruding face of the kneaded material, and the extruding face of the die may have a slit thereon in the reversed shape of the honeycomb formed body to be formed. The thus obtained honeycomb formed body may be dried by microwaves and hot air, for example.

Next, the open ends of the cells are plugged with a material similar to the material used for manufacturing of the honeycomb formed body, thus forming a plugging portion. A method for forming the plugging portion can follow a conventionally-known method for manufacturing a honeycomb filter.

Next, the thus obtained honeycomb formed body is fired, so as to obtain a honeycomb filter. Temperatures and atmosphere for the firing differ according to the raw material, and those skilled in the art can select the temperature and atmosphere for the firing that are the most suitable for the selected material. The method for manufacturing the honeycomb filter of the present invention is not limited to the method as described above.

EXAMPLES

Example 1

Firstly a kneaded material was prepared to produce a honeycomb substrate. In Example 1, for the raw material powder to prepare a kneaded material, silicon carbide (SiC) powder and metal silicon (Si) powder were mixed at the mass ratio of 80:20 to prepare a mixture powder. To the mixture powder, binder, a pore former and water were added to have a forming raw material. Next, the forming raw material was kneaded to have a round pillar-shaped kneaded material.

Next, the kneaded material was extruded using a die for manufacturing of a honeycomb formed body to have a honeycomb formed body having a round pillar shape as the overall shape.

Next, this honeycomb formed body was dried by a microwave dryer, and then was dried completely by a hot-air drier, and then both end faces of the honeycomb formed body were cut so as to have predetermined dimensions.

Next, a plugging portion was formed to the dried honeycomb formed body. Specifically a mask was firstly applied to the inflow end face of the honeycomb formed body so as to cover the inflow cells. Subsequently the masked end at of the honeycomb formed body was immersed in slurry for plugging to fill the open ends of the outflow cells without the mask with the slurry for plugging. Subsequently the outflow end face of the honeycomb formed body also was filled with slurry for plugging at the open ends of the inflow cells similarly to the above. Subsequently the honeycomb formed body having the plugging portion formed was further dried by a hot-air drier.

Next the honeycomb formed body having the plugging portion formed was degreased and fired, so as to obtain a honeycomb filter.

The honeycomb filter of Example 1 had a cell configuration as in the honeycomb filter 200 shown in FIG. 9, including eight pentagonal inflow cells 22a that surround a square outflow cell 22b. The honeycomb filter of Example 1 had porosity of the partition wall of 63%. The end faces had a diameter of 143.8 mm and the length in the cell extending direction was 152.4 mm. The porosity of the partition wall is a value measured with a mercury porosimeter. The honeycomb filter of Example 1 had thickness T1 of the first partition wall 21a of 260 μm and thickness T2 of the second partition wall 21b of 248 μm shown in FIG. 9. Therefore the honeycomb filter of Example 1 had the value of ratio (T1/T2) of thickness T1 of the first partition wall to thickness T2 of the second partition wall that was 1.05. Table 1 shows the values of "thickness T1 of first partition wall (μm)", "thickness T2 of second partition wall (μm)", and "T1/T2".

For the honeycomb filter of Example 1, the "pressure loss" and the "thermal shock resistance" were evaluated by the following method. Table 1 shows the result.

(Evaluations on Pressure Loss)

Pressure loss of the honeycomb filters of Examples was evaluated using the value of pressure loss of "a honeycomb filter as the reference" measured under the same condition. More specifically pressure loss was measured at the air volume of 10 m$^3$/min., using a large-sized wind-tunnel apparatus. Let that the value of pressure loss of the honeycomb filter as the reference was $P_0$ and the value of pressure loss of the honeycomb filter of each Example was $P_1$, the value calculated by $(P_1-P_0)/P_0 \times 100$ was obtained as the result of the pressure loss evaluation. In Examples 1 to 30, Comparative Example 1 was used as their reference honeycomb filter. In this measurement of pressure loss, three types of pressure loss was evaluated, including the pressure loss of a honeycomb filter without soot accumulated and the pressure loss of the honeycomb filter with 4 g/L and 8 g/L of soot accumulated. In Table 1, the result described in the field of "0 g/L" of "Amount of soot" indicates the result of evaluation about the pressure loss for each honeycomb filter without soot accumulated. In Table 1, the results described in the fields of "4 g/L" and "8 g/L" of "Amount of soot" indicate the results of evaluation about the pressure loss for each honeycomb filter with 4 g/L and 8 g/L, respectively, of soot accumulated.

(Thermal Shock Resistance)

Firstly using an engine bench coming with a 2.0-L diesel engine, a predetermined amount of soot was generated under a constant operating condition, and the generated soot was deposited on the surface of the partition wall of the honeycomb filters of Examples and Comparative Examples. Next, regeneration treatment was performed using postinjection to increase the inlet gas temperature of the honeycomb filter. When pressure loss measured before and after the honeycomb filter began to decrease, the postinjection was stopped, and the engine was switched to an idle state. The predetermined amount of soot deposition before regeneration treatment was gradually increased. This operation was repeated until cracks occurred at the honeycomb filters. The amount of soot deposition that caused cracks in the honeycomb filters was considered as "deposition limit of soot" of the honeycomb filters. "Deposition limit of soot" of the honeycomb filters was evaluated in accordance with the following criteria. In Examples 1 to 30, Comparative Example 1 was used as their reference honeycomb filter.

Evaluation "excellent": Let that the "deposition limit of soot" of the reference honeycomb filter is set at 100%, when the "deposition limit of soot" of a honeycomb filter to be evaluated is 110% or more, it is evaluated as "excellent".

Evaluation "good": Let that the "deposition limit of soot" of the reference honeycomb filter is set at 100%, when the "deposition limit of soot" of a honeycomb filter to be evaluated is 100% or more and less than 110%, it is evaluated as "good".

Evaluation "fail": Let that the "deposition limit of soot" of the reference honeycomb filter is set at 100%, when the "deposition limit of soot" of a honeycomb filter to be evaluated is less than 100%, it is evaluated as "fail".

Examples 2 to 30

A honeycomb filter of this Comparative Example was manufactured similarly to Example 1 other than that "thickness T1 of the first partition wall (μm)", "thickness T2 of the second partition wall (μm)" and "T1/T2" were changed as

TABLE 1

| | Thickness T1 of 1st partition wall (μm) | Thickness T2 of 2nd partition wall (μm) | T1/T2 | Pressure loss Amount of soot | | | Thermal shock resistance |
|---|---|---|---|---|---|---|---|
| | | | | 0 g/L | 4 g/L | 8 g/L | |
| Comp. Ex.1 | 250 | 250 | 1.00 | Reference | Reference | Reference | good |
| Ex.1 | 260 | 248 | 1.05 | −5% | −5% | −5% | good |
| Ex.2 | 271 | 246 | 1.10 | −10% | −10% | −10% | good |
| Ex.3 | 281 | 244 | 1.15 | −15% | −15% | −15% | good |
| Ex.4 | 290 | 242 | 1.20 | −20% | −20% | −20% | excellent |
| Ex.5 | 300 | 240 | 1.25 | −25% | −25% | −25% | excellent |
| Ex.6 | 309 | 238 | 1.30 | −20% | −20% | −20% | excellent |
| Ex.7 | 319 | 236 | 1.35 | −19% | −19% | −19% | excellent |
| Ex.8 | 328 | 234 | 1.40 | −19% | −19% | −19% | excellent |
| Ex.9 | 336 | 232 | 1.45 | −18% | −18% | −18% | excellent |
| Ex.10 | 345 | 230 | 1.50 | −18% | −18% | −18% | excellent |
| Ex.11 | 353 | 228 | 1.55 | −17% | −17% | −17% | excellent |
| Ex.12 | 362 | 226 | 1.60 | −16% | −16% | −16% | excellent |
| Ex.13 | 370 | 224 | 1.65 | −16% | −16% | −16% | excellent |
| Ex.14 | 377 | 222 | 1.70 | −15% | −15% | −15% | good |
| Ex.15 | 385 | 220 | 1.75 | −15% | −15% | −15% | good |
| Ex.16 | 392 | 218 | 1.80 | −14% | −14% | −14% | good |
| Ex.17 | 400 | 216 | 1.85 | −13% | −13% | −13% | good |
| Ex.18 | 407 | 214 | 1.90 | −13% | −13% | −13% | good |
| Ex.19 | 413 | 212 | 1.95 | −12% | −12% | −12% | good |
| Ex.20 | 420 | 210 | 2.00 | −12% | −12% | −12% | good |
| Ex.21 | 437 | 208 | 2.10 | −10% | −10% | −10% | good |
| Ex.22 | 453 | 206 | 2.20 | −9% | −9% | −9% | good |
| Ex.23 | 469 | 204 | 2.30 | −8% | −8% | −8% | good |
| Ex.24 | 485 | 202 | 2.40 | −7% | −7% | −7% | good |
| Ex.25 | 500 | 200 | 2.50 | −6% | −6% | −6% | good |
| Ex.26 | 515 | 198 | 2.60 | −4% | −4% | −4% | good |
| Ex.27 | 529 | 196 | 2.70 | −3% | −3% | −3% | good |
| Ex.28 | 543 | 194 | 2.80 | −2% | −2% | −2% | good |
| Ex.29 | 557 | 192 | 2.90 | −1% | −1% | −1% | good |
| Ex.30 | 561 | 190 | 2.95 | −1% | −1% | −1% | good | shown in Table 1. For the honeycomb filters of Examples 2 to 30, the "pressure loss" and "thermal shock resistance" were evaluated by the method similar to Example 1. Table 1 shows the result.

Comparative Example 1

A honeycomb filter of this Comparative Example was manufactured similarly to Example 1 other than that "thickness T1 of the first partition wall (μm)", "thickness T2 of the second partition wall (μm)" and "T1/T2" were changed as shown in Table 1. That is, in Comparative Example 1, a honeycomb filter with thickness T1 of the first partition wall and thickness T2 of the second partition wall was manufactured so that T1 and T2 were the same value.

Examples 31 to 60

In Examples 31 to 60, the amount of pore former was increased during the preparation of a kneaded material to manufacture a honeycomb substrate as compared with the kneaded material prepared in Example 1, so as to manufacture a honeycomb filter including the partition wall having the porosity of 41%. Honeycomb filters of these Examples were manufactured similarly to Example 1 other than that "thickness T1 of the first partition wall (μm)", "thickness T2 of the second partition wall (μm)" and "T1/T2" were changed as shown in Table 2 by using such a kneaded material. For the honeycomb filters of Examples 31 to 60, the "pressure loss" and "thermal shock resistance" were evaluated by the method similar to Example 1. Table 2 shows the result. In Examples 31 to 60, Comparative Example 2 described below was used as their reference honeycomb filter.

Comparative Example 2

A honeycomb filter of this Comparative Example was manufactured similarly to Example 31 other than that "thickness T1 of the first partition wall (m)", "thickness T2 of the second partition wall (μm)" and "T1/T2" were changed as shown in Table 2. That is, in Comparative Example 2, a honeycomb filter with thickness T1 of the first partition wall and thickness T2 of the second partition wall was manufactured so that T1 and T2 were the same value.

TABLE 2

| | Thickness T1 of 1st partition wall (μm) | Thickness T2 of 2nd partition wall (μm) | T1/T2 | Pressure loss Amount of soot 0 g/L | 4 g/L | 8 g/L | Thermal shock resistance |
|---|---|---|---|---|---|---|---|
| Comp. Ex.2 | 250 | 250 | 1.00 | Reference | Reference | Reference | good |
| Ex.31 | 260 | 248 | 1.05 | −3% | −3% | −3% | good |
| Ex.32 | 271 | 246 | 1.10 | −5% | −5% | −5% | good |
| Ex.33 | 281 | 244 | 1.15 | −8% | −8% | −8% | good |
| Ex.34 | 290 | 242 | 1.20 | −10% | −10% | −10% | excellent |
| Ex.35 | 300 | 240 | 1.25 | −13% | −13% | −13% | excellent |
| Ex.36 | 309 | 238 | 1.30 | −10% | −10% | −10% | excellent |
| Ex.37 | 319 | 236 | 1.35 | −10% | −10% | −10% | excellent |
| Ex.38 | 328 | 234 | 1.40 | −9% | −9% | −9% | excellent |
| Ex.39 | 336 | 232 | 1.45 | −9% | −9% | −9% | excellent |
| Ex.40 | 345 | 230 | 1.50 | −9% | −9% | −9% | excellent |
| Ex.41 | 353 | 228 | 1.55 | −9% | −9% | −9% | excellent |
| Ex.42 | 362 | 226 | 1.60 | −8% | −8% | −8% | excellent |
| Ex.43 | 370 | 224 | 1.65 | −8% | −8% | −8% | excellent |
| Ex.44 | 377 | 222 | 1.70 | −8% | −8% | −8% | good |
| Ex.45 | 385 | 220 | 1.75 | −7% | −7% | −7% | good |
| Ex.46 | 392 | 218 | 1.80 | −7% | −7% | −7% | good |
| Ex.47 | 400 | 216 | 1.85 | −7% | −7% | −7% | good |
| Ex.48 | 407 | 214 | 1.90 | −6% | −6% | −6% | good |
| Ex.49 | 413 | 212 | 1.95 | −6% | −6% | −6% | good |
| Ex.50 | 420 | 210 | 2.00 | −6% | −6% | −6% | good |
| Ex.51 | 437 | 208 | 2.10 | −5% | −5% | −5% | good |
| Ex.52 | 453 | 206 | 2.20 | −5% | −5% | −5% | good |
| Ex.53 | 469 | 204 | 2.30 | −4% | −4% | −4% | good |
| Ex.54 | 485 | 202 | 2.40 | −3% | −3% | −3% | good |
| Ex.55 | 500 | 200 | 2.50 | −3% | −3% | −3% | good |
| Ex.56 | 515 | 198 | 2.60 | −2% | −2% | −2% | good |
| Ex.57 | 529 | 196 | 2.70 | −2% | −2% | −2% | good |
| Ex.58 | 543 | 194 | 2.80 | −1% | −1% | −1% | good |
| Ex.59 | 557 | 192 | 2.90 | 0% | 0% | 0% | good |
| Ex.60 | 561 | 190 | 2.95 | −1% | −1% | −1% | good |

Examples 61 to 64

In Examples 61 to 64, a honeycomb filter as in the honeycomb filter 100 of FIG. 7 was manufactured, which had a cell configuration including four hexagonal inflow cells 2a that surrounded a square outflow cell 2b. Raw materials to manufacture these honeycomb filters were similar to those in Example 1. The honeycomb filters of Examples 61 to 64 had porosity of the partition wall of 63%. Table 3 shows the values of "thickness T1 of first partition wall (μm)", "thickness T2 of second partition wall (μm)", and "T1/T2" of the honeycomb filters of Examples 61 to 64. For the honeycomb filters of Examples 61 to 64, the "pressure loss" and "thermal shock resistance" were evaluated by the method similar to Example 1. Table 3 shows the result. In Examples 61 to 64, Comparative Example 3 described below was used as their reference honeycomb filter.

Comparative Example 3

A honeycomb filter of this Comparative Example was manufactured similarly to Example 61 other than that "thickness T1 of the first partition wall (μm)", "thickness T2 of the second partition wall (μm)" and "T1/T2" were changed as shown in Table 3. That is, in Comparative Example 3, a honeycomb filter with thickness T1 of the first partition wall and thickness T2 of the second partition wall was manufactured so that T1 and T2 were the same value.

TABLE 3

| | Thickness T1 of 1st partition wall (μm) | Thickness T2 of 2nd partition wall (μm) | T1/T2 | Cell shape | Porosity | Pressure loss Amount of soot | | | Thermal shock resistance |
|---|---|---|---|---|---|---|---|---|---|
| | | | | | | 0 g/L | 4 g/L | 8 g/L | |
| Comp. Ex.3 | 330 | 330 | 1.00 | FIG. 7 | 63 | Reference | Reference | Reference | good |
| Ex.61 | 336 | 320 | 1.05 | FIG. 7 | 63 | −5% | −5% | −5% | excellent |
| Ex.62 | 372 | 310 | 1.20 | FIG. 7 | 63 | −20% | −20% | −20% | excellent |
| Ex.63 | 450 | 300 | 1.50 | FIG. 7 | 63 | −19% | −19% | −19% | excellent |
| Ex.64 | 400 | 200 | 2.00 | FIG. 7 | 63 | −19% | −19% | −19% | good |

Examples 65 to 68

In Examples 65 to 68, a honeycomb filter as in the honeycomb filter 100 of FIG. 7 was manufactured, which had a cell configuration including four hexagonal inflow cells 2a that surrounded a square outflow cell 2b. Raw materials to manufacture these honeycomb filters were similar to those in Example 31. The honeycomb filters of Examples 65 to 68 had porosity of the partition wall of 41%. Table 4 shows the values of "thickness T1 of first partition wall (μm)", "thickness T2 of second partition wall (μm)", and "T1/T2" of the honeycomb filters of Examples 65 to 68. For the honeycomb filters of Examples 65 to 68, the "pressure loss" and "thermal shock resistance" were evaluated by the method similar to Example 1. Table 4 shows the result. In Examples 65 to 68, Comparative Example 4 described below was used as their reference honeycomb filter.

Comparative Example 4

A honeycomb filter of this Comparative Example was manufactured similarly to Example 65 other than that "thickness T1 of the first partition wall (μm)", "thickness T2 of the second partition wall (μm)" and "T1/T2" were changed as shown in Table 4. That is, in Comparative Example 4, a honeycomb filter with thickness T1 of the first partition wall and thickness T2 of the second partition wall was manufactured so that T1 and T2 were the same value.

TABLE 4

| | Thickness T1 of 1st partition wall (μm) | Thickness T2 of 2nd partition wall (μm) | T1/T2 | Cell shape | Porosity | Pressure loss Amount of soot | | | Thermal shock resistance |
|---|---|---|---|---|---|---|---|---|---|
| | | | | | | 0 g/L | 4 g/L | 8 g/L | |
| Comp. Ex.4 | 330 | 330 | 1.00 | FIG. 7 | 41 | Reference | Reference | Reference | good |
| Ex.65 | 336 | 320 | 1.05 | FIG. 7 | 41 | −3% | −3% | −3% | excellent |
| Ex.66 | 372 | 310 | 1.20 | FIG. 7 | 41 | −10% | −10% | −10% | excellent |
| Ex.67 | 450 | 300 | 1.50 | FIG. 7 | 41 | −10% | −10% | −10% | excellent |
| Ex.68 | 400 | 200 | 2.00 | FIG. 7 | 41 | −9% | −9% | −9% | good |

(Results)

The honeycomb filters of Examples 1 to 68 had lower pressure loss than those of their reference honeycomb filters of Comparative Examples 1 to 4. That is, it was confirmed that the configuration having thickness T1 of the first partition wall larger than thickness T2 of the second partition wall enabled such low pressure loss of the honeycomb filters. The result of the honeycomb filters of Examples 1 to 30 shows that the honeycomb filters of Examples 1 to 25 had low pressure loss very favorably as well as excellent thermal shock resistance. The result of evaluations of pressure loss of the honeycomb filters of Examples 3 to 14 shows that the value of "T1/T2" within the range of 1.15 to 1.70 enabled particularly low pressure loss.

A honeycomb filter of the present invention can be used for a filter to purify exhaust gas.

DESCRIPTION OF REFERENCE NUMERALS 1,21: partition wall, 1a, 21a: first partition wall, 1b, 21b: second partition wall, 2, 22: cell, 2a, 22a: inflow cell, 2b, 22b: outflow cell, 3; circumferential wall, 4, 24: honeycomb substrate, 5, 25: plugging portion, 11, 31: inflow end face, 12: outflow end face, 100, 200: honeycomb filter, T1: thickness of first partition wall, T2: thickness of second partition wall

What is claimed is:

1. A honeycomb filter, comprising: a pillar-shaped honeycomb substrate having an inflow end face and an outflow end face and including porous partition walls that surrounds a plurality of cells extending from the inflow end face to the outflow end face; and
   a plugging portion disposed at any one of ends of the cells at the inflow end face and at the outflow end face,
   wherein in a cross section orthogonal to an extending direction of the cells, inflow cells having the plugging portion at the ends of the outflow end face have a pentagonal or a hexagonal shape,
   outflow cells having the plugging portion at the ends of the inflow end face have a square shape,
   the plurality of cells is configured so that a plurality of the inflow cells surrounds one outflow cell and one side of an inflow cell and one side of an adjacent outflow cell are parallel to each other,
   the partition walls includes first partition walls each with a thickness T1 disposed between the inflow cells and the outflow cells, and second partition walls each with a thickness T2 disposed between the inflow cells, and the thickness T1 of all of the first partition walls is larger than the thickness T2 of all of the second partition walls.

2. The honeycomb filter according to claim 1, wherein a value of ratio (T1/T2) of the thickness T1 of the first partition walls to the thickness T2 of the second partition walls is 1.05 to 2.95.

3. The honeycomb filter according to claim 2, wherein the value of ratio (T1/T2) of the thickness T1 of the first partition walls to the thickness T2 of the second partition walls is 1.1 to 2.15.

4. The honeycomb filter according to claim 1, wherein the thickness T1 of each of the first partition wall is 150 to 600 μm.

5. The honeycomb filter according to claim 1, wherein the outflow cells have a smaller hydraulic diameter than a hydraulic diameter of the inflow cells.

6. The honeycomb structure according to claim 1, wherein the outflow cells have a length of one side of 0.6 to 3.0 mm.

7. The honeycomb filter according to claim 1, wherein the partition walls have porosity of 35 to 70%.

8. The honeycomb filter according to claim 7, wherein the partition walls have porosity of 50 to 70%.

9. The honeycomb filter according to claim 1, wherein in a cross section orthogonal to an extending direction of the cells,
the honeycomb filter has a configuration of four of the inflow cells having a hexagonal shape surrounding one of the outflow cells or the honeycomb filter has a configuration of eight of the inflow cells having a pentagonal shape surrounding one of the outflow cells.

* * * * *